(12) United States Patent
Zamfes

(10) Patent No.: US 7,418,854 B2
(45) Date of Patent: Sep. 2, 2008

(54) FORMATION GAS PORE PRESSURE EVALUATION ON DRILLING CUTTINGS SAMPLES

(76) Inventor: Konstandinos Zamfes, 1830-10 Ave. SW., Calgary (CA) T3C 0J8

( * ) Notice: Subject to any disclaimer, the term of this patent is extended or adjusted under 35 U.S.C. 154(b) by 122 days.

(21) Appl. No.: 10/711,469

(22) Filed: Sep. 20, 2004

(65) Prior Publication Data
US 2005/0066720 A1   Mar. 31, 2005

Related U.S. Application Data

(60) Provisional application No. 60/481,446, filed on Sep. 30, 2003.

(51) Int. Cl.
*G01N 7/00* (2006.01)
(52) U.S. Cl. .................................... 73/19.01
(58) Field of Classification Search .............. 73/19.01
See application file for complete search history.

(56) References Cited

U.S. PATENT DOCUMENTS 3,779,070 A * 12/1973 Cushman et al. ........... 73/865.5
6,386,026 B1    5/2002 Zamfes .................. 73/152.04
6,666,067 B2 * 12/2003 Stolper ..................... 73/19.01

OTHER PUBLICATIONS

U.S. Appl. No. 10/711,435, filed Sep. 17, 2004, Zamfes.

* cited by examiner

*Primary Examiner*—Hezron E. Williams
*Assistant Examiner*—John Fitzgerald
(74) *Attorney, Agent, or Firm*—Diederiks & Whitelaw PLC

(57) ABSTRACT

We disclose an apparatus and process for measuring the Formation Gas Pore Pressure in drilling cuttings samples in the test tube. The Apparatus consist of vertical holder for test tube, for placing the cutting sample and pipette for adding measurable quantity of liquid. (Note: "vertical holder for test tube and test tube" are disclosed in U.S. patent application Ser. No. 10/711,435 Horizontal Binocular Microscope for vertically gravitated and floating samples). The process consist in measuring the gas bubbles size and volume in the test tube and the height of liquid covering the bubble. This we can calculate the volume and the pressure of the gas emitted out of the pores. By adding/subtracting more liquid to the sample and increasing/decreasing the height and the pressure of the liquid on the pore the test is repeated and the measurements documented in the tables for math processing to obtain the error corrections and standard deviation of the measurements. The results are expressed in Emission=V/P=mm3/Pa, Total Volume=V=mm3, Maximum Pressure=P=Pa.

17 Claims, 2 Drawing Sheets

Gas Bubbles Emmited From Pores
In Drilling Cuttings Sample

Gas Bubbles Emmited From Pores
In Drilling Cuttings Sample

Bubbles Produced in Sample
Under Horizontal Microscope

FORMATION GAS PORE PRESSURE EVALUATION ON DRILLING CUTTINGS SAMPLES

CROSS REFERENCE TO RELATED APPLICATIONS

References Cited: U.S. patent application Ser. No. 10/711,435 Kosta Zamfes Sep. 17, 2004; U.S. Pat. No. 6,386,026 B1 Kosta Zamfes May 14, 2002.

FIELD OF INVENTION

The invention relates to apparatus and process for obtaining the Formation Pore Pressure form the drilling cuttings sample. This reflecting the physical and petrophysical properties of the formation drilled for Oil and Gas or other targets. These measurements are obtained at the surface. While drilling, the mudflow brings the cuttings to the surface and from the cuttings samples the process and apparatus of this invention are producing the information.

BACKGROUND OF INVENTION

During the drilling of the well, mud is circulating downhill and brings up the formation cuttings of the strata penetrated at this time. After the lag time, which comprises of the annular velocity and the depth of the well, the cuttings arrive to the surface. At the surface the sample catcher devise, disclosed by the author in patented U.S. Pat. No. 6,386,026 B1 May 14, 2002, is capturing the material and at this time the apparatus and process disclosed in this invention are measuring the physical, physical-chemical and petrochemical properties of the formation.

Conventionally grinding the sample or steaming it and measuring the gas extracted by using Gas Detectors with catalytic combustion sensors do some of the cutting gas extraction. We disclose the ways to obtain the Emission=V/P=mm3/Pa, Total Volume=V=mm3, Maximum Pressure=P=Pa of the samples of the drilled strata.

SUMMARY OF INVENTION

Apparatus and process of this invention are provided for obtaining the specific properties of the drilled formation or any descried formation sampled. The apparatus and process for measuring the Formation Gas Pore Pressure on drilling cuttings samples in the test tube consist:

The Apparatus consist of vertical holder for test tube, test tube for placing the cutting sample and pipette for adding measurable quantity of liquid. (Note: "vertical holder for test tube and test tube" are disclosed in U.S. application Ser. No. 10/711,435 Horizontal Binocular Microscope for vertically gravitated and floating samples).

The process consist in measuring the gas bubbles size and volume in the test tube and the height of liquid covering the bubble. This we can calculate the volume and the pressure of the gas emitted out of the pores. The pore size is measured by the grain sieve of fraction in the test tube. As the sample is very fine grinded (by mortal and pistil) the size may be assumed as the statistic average of the mass. This initial volume of gas in pore and the final volume in test tube are related by $v1/p1=v2/p2$. By adding/subtracting more liquid to the sample and increasing/decreasing the height and the pressure of the liquid on the pore the test is repeated and the measurements documented in the tables for math processing to obtain the error corrections and standard deviation of the measurements. The results are expressed in Emission=V/P=mm3/Pa, Total Volume=V=mm3, Maximum Pressure=P=Pa.

DETAILED DESCRIPTION

Figure 1:
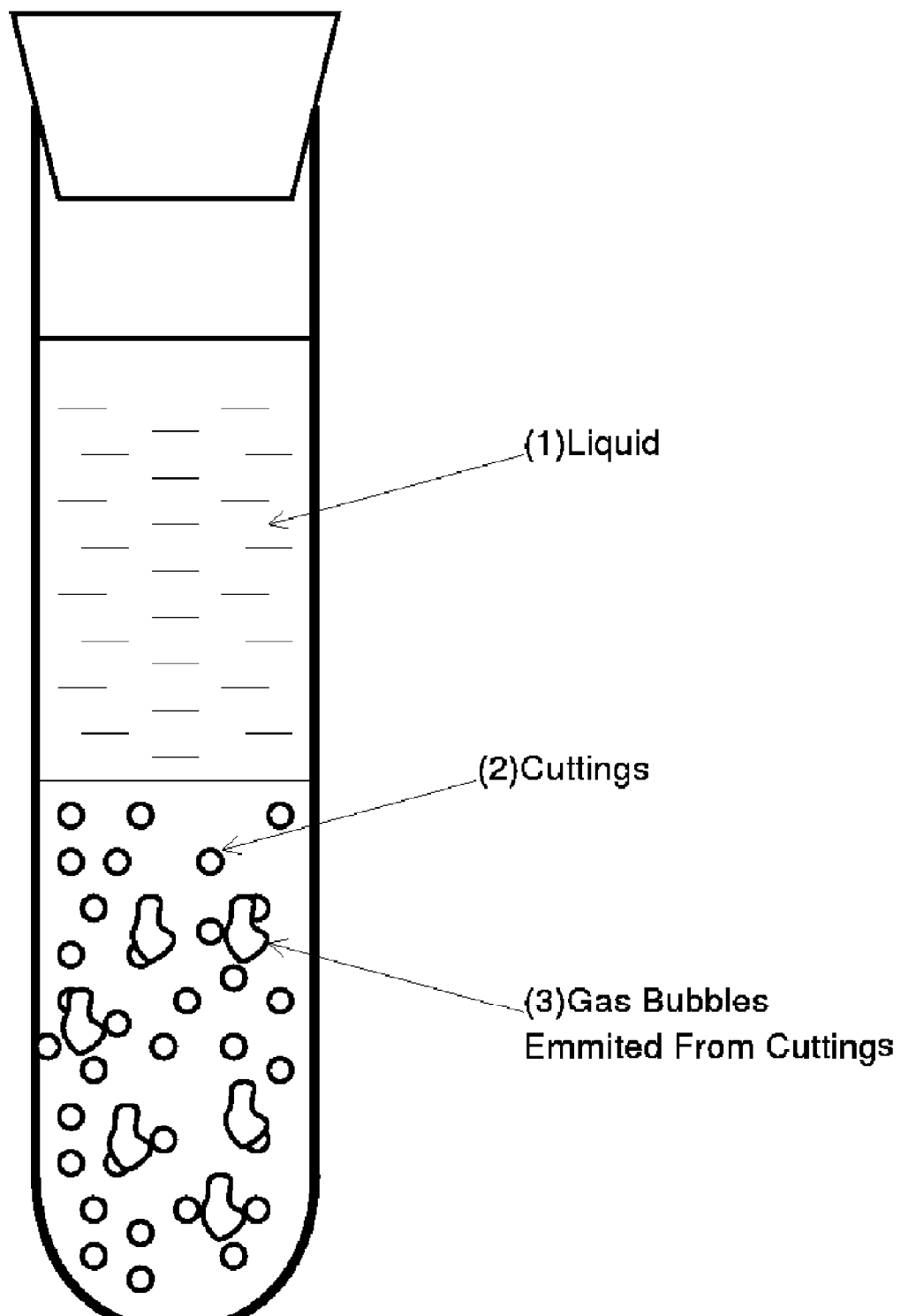
FIG. 1. A schematic of measuring the size and the height of the bubble in the test tube.
Figure 2:
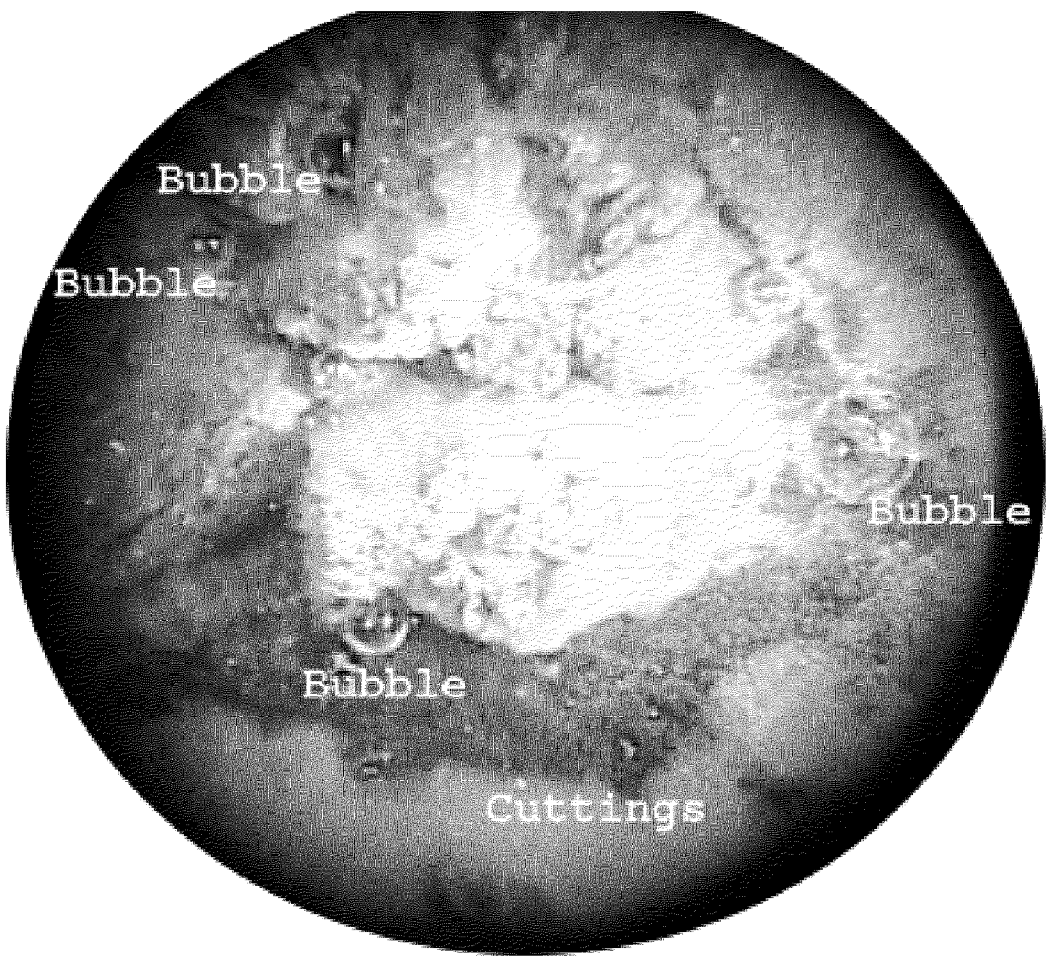
FIG. 2. The picture of the bubbles in the test tube.

Apparatus and process of this invention are provided for obtaining the specific properties of the drilled formation or any descried formation sampled. The apparatus and process for measuring the Formation Gas Pore Pressure on drilling cuttings samples in the test tube consist:

The Apparatus consist of vertical holder for test tube, test tube for placing the cutting sample and pipette for adding measurable quantity of liquid. (Note: "vertical holder for test tube and test tube" are disclosed in U.S. application Ser. No. 10/711,435 Horizontal Binocular Microscope for vertically gravitated and floating samples).

The process consist in measuring the gas bubbles size and volume in the test tube and the height of liquid covering the bubble. This we can calculate the volume and the pressure of the gas emitted out of the pores. The pore size is measured by the grain size of fraction in the test tube. As the sample is very fine grinded (by mortal and pistil) the size may be assumed as the statistic average of the mass. The size may be measured by sieving it and then taking the statistic average of the mass weight versus the sieve size. By applying the above method using 2-3 different sizes as necessary the high accuracy will be achieved. This initial volume of gas in pore and the final volume in test tube are related by $v1/p1=v2/p2$. If the size of grinded cuttings is the same (by mean) then the higher-pressure gas will create the bigger size bubbles. By repeating the test and adding/subtracting more liquid to the sample and increasing/decreasing the height and the pressure of the liquid on the pore the test is repeated and the measurements documented in the tables for math processing to obtain the error corrections and standard deviation of the measurements. The results are expressed in Emission=V/P=mm3/Pa, Total Volume=V=mm3, Maximum Pressure=P=Pa.

What is claimed is:

1. A method of determining the gas pore pressure of a drill cutting sample, comprising:
   a. passing a grinded sample having fine particles, the grinded sample being obtained by grinding a drill cutting sample taken from an earth drilling process, through a first sieve having a first size;
   b. calculating a statistic average of a mass weight of the grinded sample which passes through the first sieve;
   c. receiving the grinded sample in a container;
   d. receiving a liquid in the container, the liquid covering the grinded sample to an initial liquid level at an initial pressure;
   e. adding or subtracting liquid to produce a bubble or vary the size of a bubble of gas within the sample;
   f. measuring the size of the bubble and the pressure; and
   g. calculating the gas pore pressure.

2. The method of claim 1, further comprising calculating a volume based on a spherical bubble and determining an emission from the formula emission=volume/pressure.

3. The method of claim 1, the pressure being atmospheric pressure.

4. The method of claim 1, wherein the size of the bubble is measured by relative comparison of the bubble diameter to the second size of the second sieve.

5. The method of claim 1, wherein the size of the bubble is measured by relative comparison of the bubble diameter to the third size of the third sieve.

6. The method of claim 1, wherein the size of the bubble is measured by the measurement of the bubble diameter by microscope.

7. The method of claim 1, the container being a test tube.

8. The method of claim 1, the liquid being a substantially clear liquid.

9. The method of claim 1, steps e-g repeated for a subsequent bubble after the initial bubble.

10. The method of claim 9, wherein steps e-g are repeated a plurality of cycles, to determine an error correction and standard deviation.

11. The method of claim 1, steps e-g repeated for a subsequent liquid level after the initial liquid level.

12. The method of claim 11, wherein steps e-g are repeated a plurality of cycles, to determine an error correction and standard deviation.

13. The method of claim 11, wherein the subsequent liquid level is higher than the initial liquid level.

14. The method of claim 11, wherein the subsequent liquid level is lower than the initial liquid level.

15. The method of claim 1, step a repeated, passing the grinded sample through a second sieve, the second sieve having a second size which is smaller than the first size.

16. The method of claim 15, step a repeated, passing the grinded sample through a third sieve, the third sieve having a third size which is smaller than the second size.

17. The method of claim 16, wherein the size of the bubble is measured by relative comparison of the bubble diameter to the first size of the first sieve.

\* \* \* \* \*